(12) United States Patent
Tsai et al.

(10) Patent No.: US 9,465,765 B2
(45) Date of Patent: Oct. 11, 2016

(54) ALL-IN-ONE SATA INTERFACE STORAGE DEVICE

(71) Applicant: PORTWELL INC., New Taipei (TW)

(72) Inventors: Ming-Hsin Tsai, New Taipei (TW); Shiou-Yu Lai, New Taipei (TW)

(73) Assignee: PORTWELL INC., New Taipei (TW)

( * ) Notice: Subject to any disclaimer, the term of this patent is extended or adjusted under 35 U.S.C. 154(b) by 551 days.

(21) Appl. No.: 13/968,877

(22) Filed: Aug. 16, 2013

(65) Prior Publication Data

US 2015/0052274 A1 Feb. 19, 2015

(51) Int. Cl.
*G06F 13/40* (2006.01)

(52) U.S. Cl.
CPC ... *G06F 13/4068* (2013.01); *G06F 2213/0032* (2013.01); *G06F 2213/3804* (2013.01)

(58) Field of Classification Search
CPC .................. G06F 13/4068; G06F 2213/0032; G06F 2213/3804
USPC ........................................................ 710/301
See application file for complete search history.

(56) References Cited

U.S. PATENT DOCUMENTS

| | | | |
|---|---|---|---|
| 7,222,205 B2 * | 5/2007 | Jones ...................... | G06F 13/38 710/301 |
| 2005/0033917 A1 * | 2/2005 | Takeuchi .............. | G06F 13/385 711/115 |
| 2005/0258243 A1 | 11/2005 | Hsieh | |
| 2009/0005177 A1 * | 1/2009 | Kishi .................... | G06F 21/123 463/43 |
| 2012/0281355 A1 * | 11/2012 | Yao ....................... | G06F 13/409 361/679.48 |

OTHER PUBLICATIONS

"2CF2SATAR Instruction Manual: SATA or USB to CompactFash Adapter"; StarTech.com; undated.*
Amazon.com listing "StarTech.com 2.5-Inch SATA or USB to Dual Compact Flash Solid State Drive Adapter with RAID 2CF2SATAR"; <URL:http://www.amazon.com/StarTech-com-2-5-Inch-Compact-Adapter-2CF2SATAR/dp/B0028Y1D9I>; Sep. 14, 2004.*
"CompactFlash"; Wikipedia entry <URL: https://en.wikipedia.org/wiki/CompactFlash>, late updated Feb. 2, 2016, accessed Feb. 18, 2016.*
"CFast—Evolution of the CompactFlash Interface" white paper; CompactFlash Association; Apr. 14, 2008.*
"Compact Flash SATA Card Announced" Press Release; TechPowerUp; <URL: http://www.techpowerup.com/35303/compact-flash-sata-card-announced.html>; Jul. 19, 2007.*

* cited by examiner

*Primary Examiner* — Glenn A Auve
(74) *Attorney, Agent, or Firm* — Muncy, Geissler, Olds & Lowe, P.C.

(57) ABSTRACT

An all-in-one SATA interface storage device comprising: an interface board installed on a motherboard; a first memory card slot which is a CFast slot fixed on the interface board for installation of a CFast card; a second memory card slot fixed on the interface board and available to CF-SATA and CFEX cards for installation of either a CF-SATA card or a CFEX card. As such, the present invention facilitates applications of multiple storage devices via its SATA interfaces linking a host system, providing a user more convenient new storage devices, and creating higher value-added services by lowering costs.

10 Claims, 5 Drawing Sheets

ALL-IN-ONE SATA INTERFACE STORAGE DEVICE

BACKGROUND OF THE INVENTION

1. Field of the Invention

The present invention relates to a storage device, particularly an all-in-one SATA interface storage device based on SATA interfaces for data storages, boot disk applications and convenient data transmission.

2. Description of the Related Art

The principal IT storage devices or media such as digital camera, recording pen, and music player rely on mature technology for manufacture of compact flash memories, particularly CF cards (Compact Flash cards), CFAST(CompactFlash)™ cards, CFEX cards, or CF-SATA cards, which are based on SATA interfaces (or other available interfaces) for data storages or boot disk applications and widely adopted in various IT products, and have been even taken as host computers' system hard drives substituting conventional IDE hard disks because of their multiple advantages including good compatibility, high access speed, high capacity, ultra-low power consumption, compact structure, dust prevention, good vibration strength, and impact resistance.

A conventional CF module (plug-in module) as shown in FIG. 1 for its structure and technology comprises: a CF slot 94, which is installed on a motherboard 90 and coupled with a CF card 95; a CPU socket 91 fixed on the motherboard 90 for a CPU to be mounted; expansion slots 92 (e.g., PCI bus); a chip 93; and relevant electronic components or circuits. As a high-speed high-stability transmission interface for data access, the conventional CF module still has some drawbacks, for example, the conventional CF slot 94 is available to a single CF card (i.e., CF module) for one single function. Therefore, two or more slots for storage cards (e.g., CF-SATA card, CFast card, or CFEX card) with multiple storage interfaces incompatible with each other have to be designed on the motherboard 90. Nevertheless, the current technology for data migrations among several types of storage cards is based on additional storage media, for example, an unideal design with a complicated operation mode and dissatisfactory time efficiency shown as follows: data in Storage Device A is reproduced in a host's storage media and then either Storage Device B or Storage Device C as a target device in which data in Storage Device A will be saved because of no direct data transmission between different storage devices. Moreover, the mechanism of removing data, which is originally saved in a user's old storage device to be replaced by a new one, to the new storage device is costly and needs to be further corrected because it discourages a user's willingness to try new storage media, disadvantaging development of new technology for storage media or improvement of work efficiency. Against this background, how to correct drawbacks in applications of a conventional storage interface deserves to be studied by persons skilled in the art.

Having considered defects and unideal structural design of a conventional storage interface in usage and operation for a long time, the inventor offered a solution and manufactured the present invention of an all-in-one SATA interface storage device featuring convenience, transmission efficiency, and economic benefits herein for the general public and development of the industry.

SUMMARY OF THE INVENTION

The present invention provides an all-in-one SATA interface storage device which facilitates applications of multiple storage devices via its SATA interfaces linking a host system, providing a user more convenient new storage devices, and creating higher value-added services by lowering costs.

The present invention comprises the following technical measures to realize the above purposes: an interface board installed on a motherboard; a first memory card slot which is a CFAST(CompactFlash)™ slot fixed on the interface board and coupled with a CFAST(CompactFlash)™ card; a second memory card slot which is available to CF-SATA and CFEX cards, fixed on the interface board, and coupled with either a CF-SATA card or a CFEX card.

For technical features and effects in terms of the present disclosure completely comprehended and recognized, the preferred embodiments and accompanying drawings are thoroughly described hereinafter.

DETAILED DESCRIPTION OF THE PREFERRED EMBODIMENTS

The present invention provides an all-in-one SATA (Serial Advanced Technology Attachment) interface storage device mounted on a motherboard and comprising an interface board which is fixed on the motherboard and prepared for installation of a first memory card slot, i.e., a CFAST (CompactFlash)™ slot with which a CFAST(CompactFlash)™ card is coupled, and a second memory card slot available to CF-SATA and CFEX cards and prepared for installation of either a CF-SATA card or a CFEX card.

Figure 1:
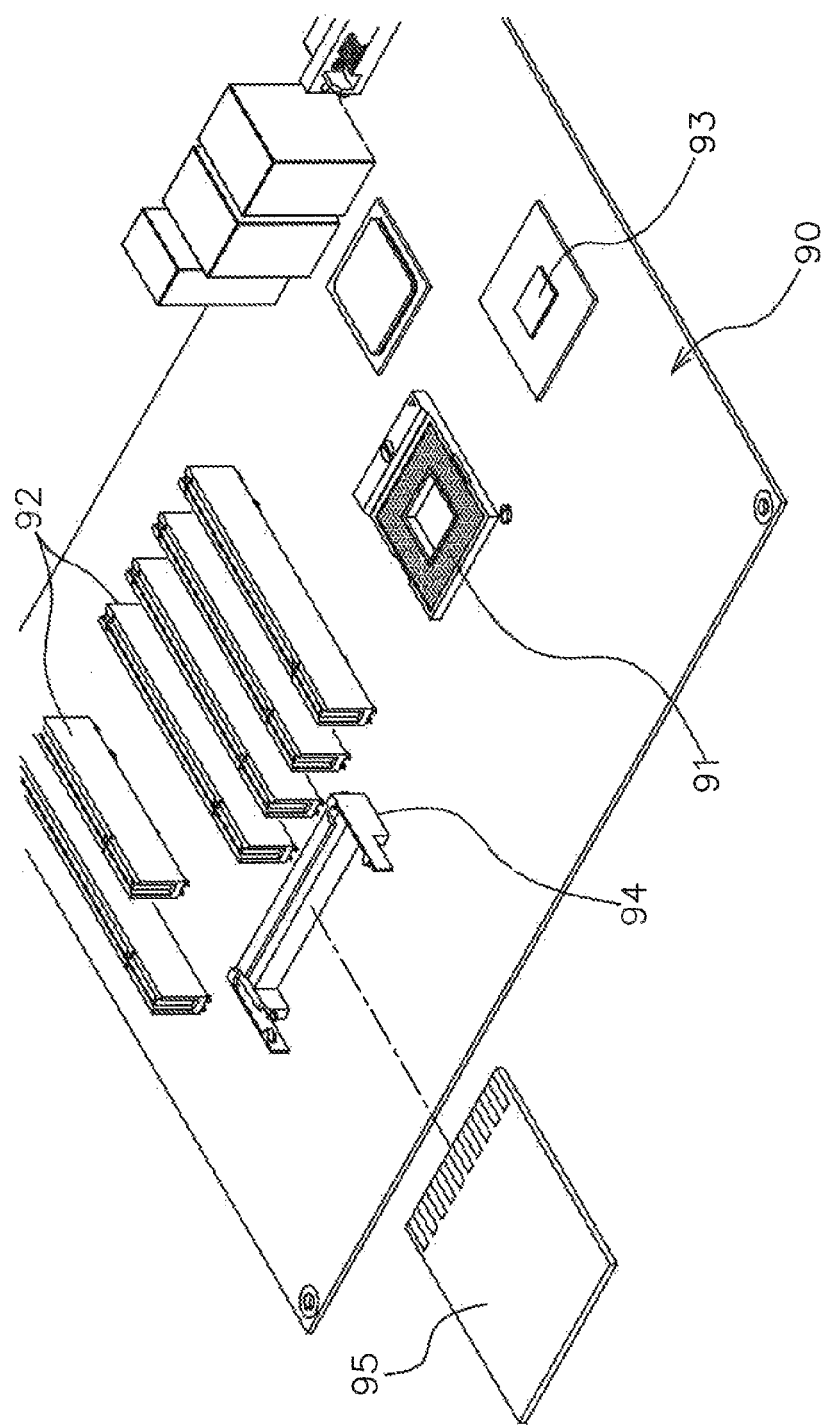
FIG. 1 is a schematic view illustrating a conventional CF Card installed on a motherboard.
Figure 2:
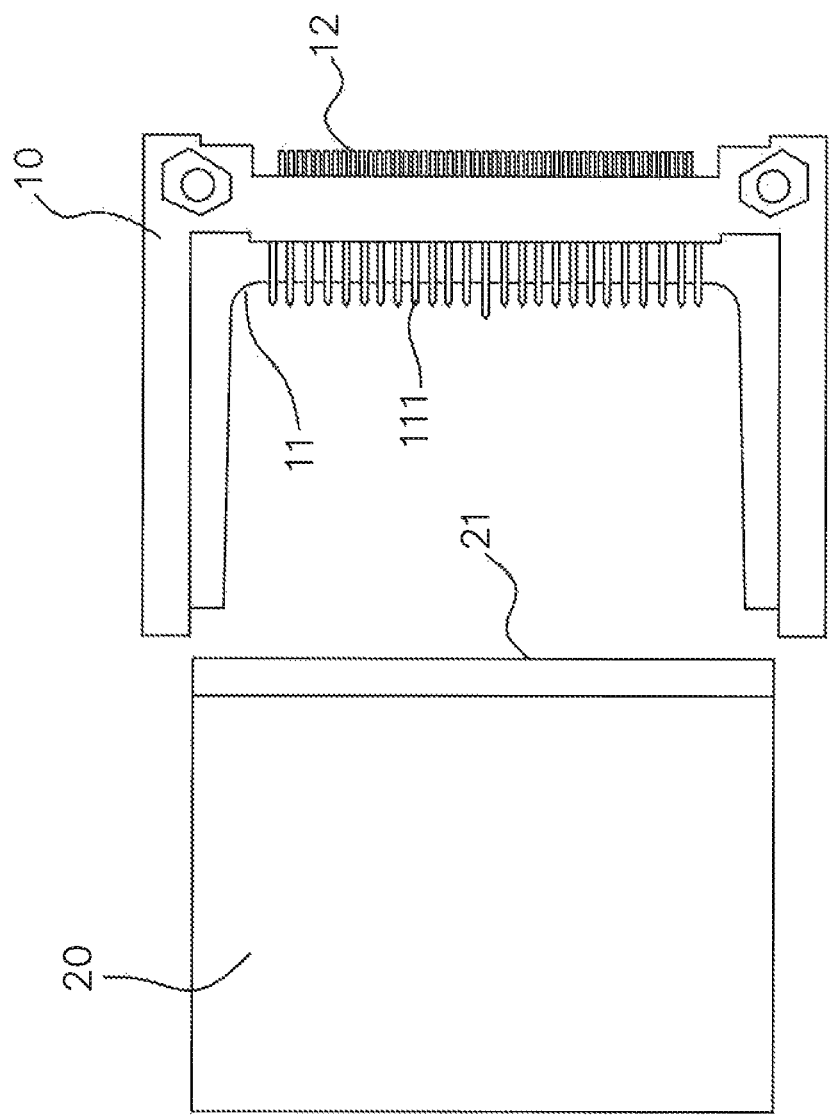
FIG. 2 is a schematic view illustrating a CFEX slot and a CFEX card in the present invention.

A CFEX slot, a CF-SATA slot, or a CFAST(CompactFlash)™ slot and corresponding cards are described and defined in the following sections. Refer to FIG. 2 that illustrates a CFEX slot 10 (CF Expansion slot and CFEX slot for short) to be electrically connected to circuits of a motherboard which is a printed circuit board (carrier) for installation of the CFEX slot 10 and not limited to the motherboard of the present invention: the CFEX slot 10 similar to an ordinary CF slot is coupled with a CFEX card 20 (CF Extension card and CFEX card for short) for stable signal communication between the CFEX card 20 and circuits on the motherboard via the CFEX slot 10; the CFEX slot 10 presented herein comprises an inward card built-in end 11 and an outward circuit connecting end 12: the circuit connecting end 12 is electrically connected to the motherboard; the card built-in end 11 is internally provided with a terminal pin unit 111 which allows one side to link the outward circuit connecting end 12 of the CFEX slot 10.

Specifically, the CFEX card 20 has an interface connector 21 used to match and link the terminal pin unit 111: the interface connector 21 exerts its functions defined as per actual functionality of the CFEX card 20; the terminal pin unit 111 exerts functions of all pins defined as those of the interface connector 21 on the CFEX card 20. Output signals transmitted from the CFEX card 20 are sent to the terminal pin unit 111 at the CFEX slot 10 via the corresponding interface connector 21, the outward circuit connecting end 12 of the CFEX slot 10 via the terminal pin unit 111, and circuits of the motherboard sequentially. In contrast, input signals transmitted from circuits of the motherboard are forwarded to the inward terminal pin unit 111 via the outward circuit connecting end 12 of the CFEX slot 10 and the corresponding interface connector 21 via the terminal pin unit 111 for completion of signal transmission from circuits of the motherboard to the CFEX card 20.

Figure 3:
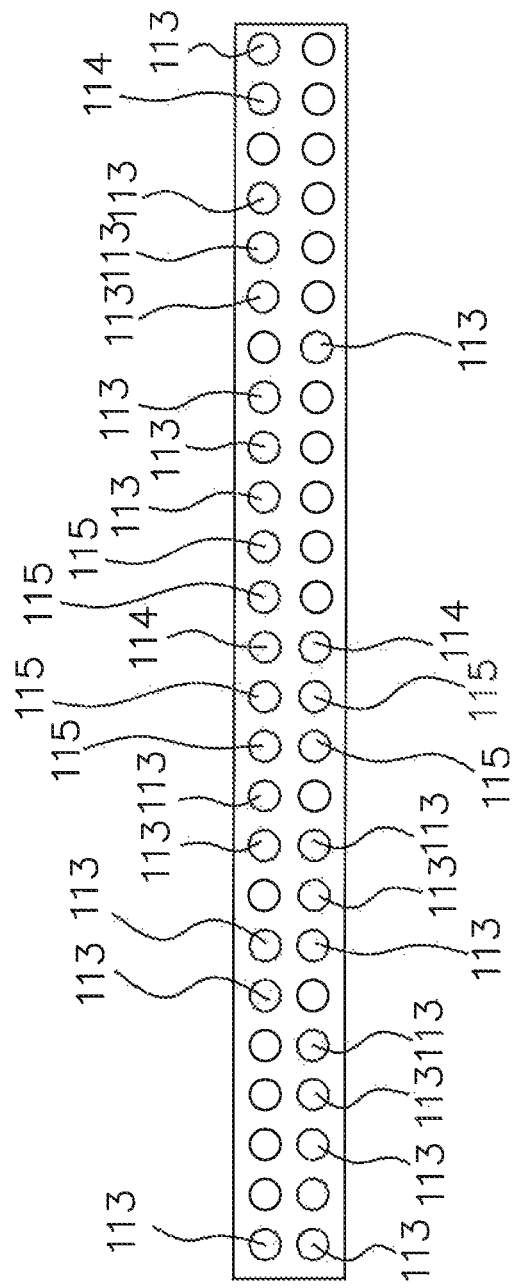
FIG. 3 is a schematic view illustrating configurations of a terminal pin unit in a CFEX slot of the present invention.

The number of pins available in the terminal pin unit 111 which is held in the card built-in end 11 can be freely decided according to realistic demands. Refer to FIG. 3 which illustrates 50 pins of the terminal pin unit 111 held in the card built-in end 11 in the embodiment. Depending to realistic functions, the terminal pin unit 111 can be defined and classified as ground pins 113, power pins 114 and functional pins 115. A terminal pin which is defined as one of the ground pins 113 implies the circuit connecting end 12 behind the terminal pin is electrically connected to ground circuits on the motherboard; a terminal pin which is defined as one of the functional pins 115 implies the circuit connecting end 12 behind the terminal pin is electrically connected to functional circuits on the motherboard for executing a specific function; a terminal pin which is defined as one of the power pins 114 implies the circuit connecting end 12 behind the terminal pin is electrically connected to power circuits on the motherboard.

The circuit connecting end 12 linking the terminal pin unit 111 of the CFEX slot 10 can be electrically connected to PCI circuits, PCI Express circuits, SATA circuits or other signal lines on the motherboard for more functional applications.

As examples presented in FIG. 3, the pins, e.g., ground pins 113, power pins 114 and functional pins 115, can be adjusted and connected to different circuits for distinct functions as per realistic functionality and demands but not limited to applications in these examples. It can be seen from above descriptions that the functions of the CFEX card 20 and the CFEX slot 10 in the present invention can be flexibly defined according to pins of the terminal pin unit 111. Moreover, the interface connector 21 based on realistic functionality of the CFEX card 20 has distinct functions at pins corresponding to those of the terminal pin unit 111 so that the CFEX card 20 is internally provided with either a single module or multiple modules, for example, wireless communications module, remote control module, hardware debugging module, and hardware monitoring module, each of which makes both the CFEX card 20 and the CFEX slot 10 exert flexible functions.

In an alternative embodiment, the outward circuit connecting end 12 of the CFEX slot 10 is not directly electrically connected to circuits of the motherboard but a SATA signal port and a SATA power port, which link a SATA signal line and a SATA power cable respectively, for transmission of SATA signals from a CFEX card 20 held in the CFEX slot 10.

Furthermore, the design for a conventional CF card with 50 pins is available in a CF-SATA slot and a CF-SATA card for transmission of SATA signals, that is, 4 of 50 pins in a CF card is used to receive SATA signals. The CF-SATA slot and the CF-SATA card have exteriors identical to those of an ordinary CF-interface slot and an ordinary CF card, respectively.

The specifications of a CFAST(CompactFlash)™ card and a CFAST(CompactFlash)™ slot should refer to CFAST (CompactFlash)™ standard specifications constituted by the Compact Flash Association: a CFAST(CompactFlash)™ slot (CFAST(CompactFlash)™ card) has appearance identical to that of an ordinary CF slot (CF card); a CFAST (CompactFlash)™ card has No. 7 pin for reception of SATA signals and No. 17 pin for power according to CFAST (CompactFlash)™ standard specifications.

Figure 4:
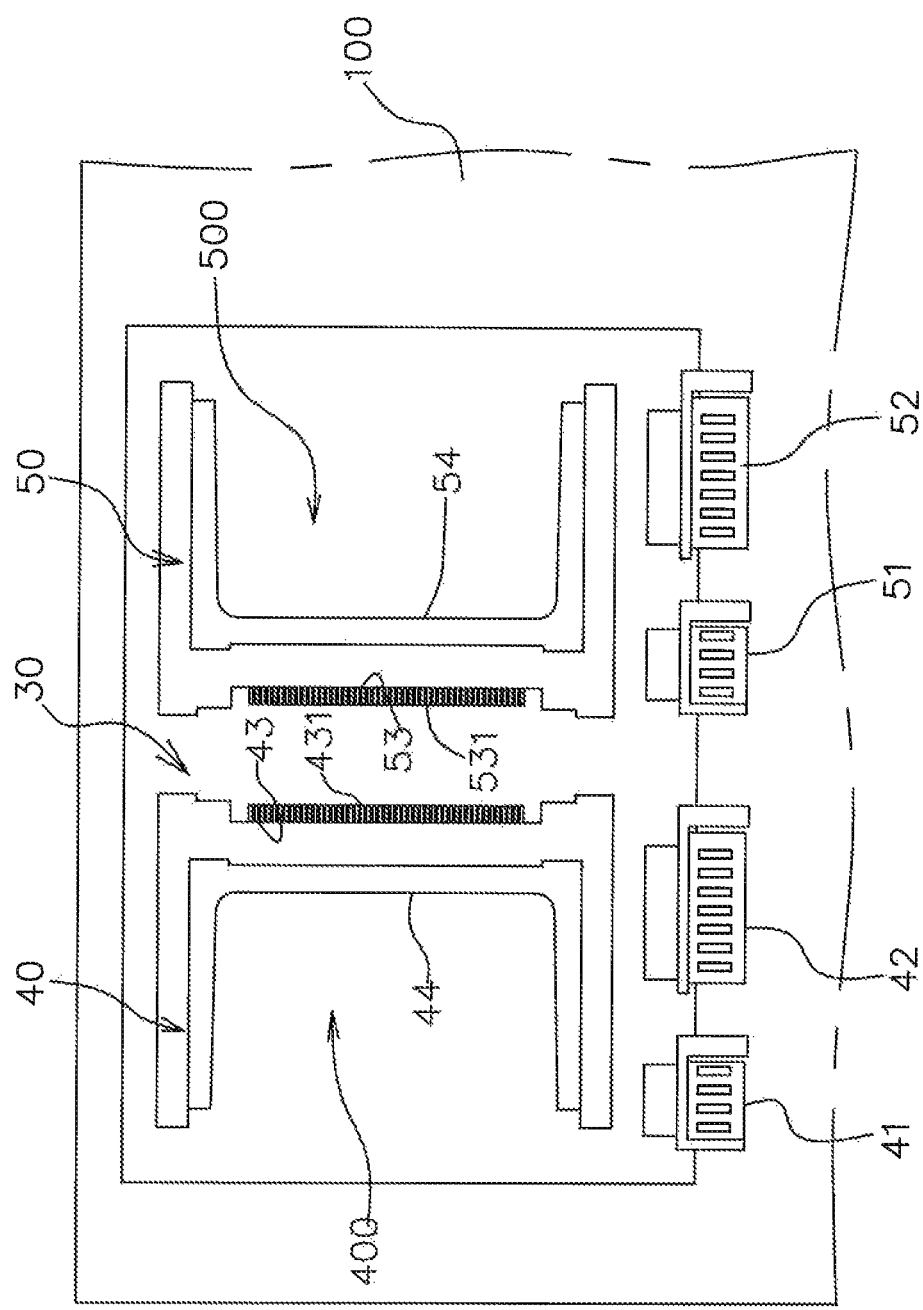
FIG. 4 is a schematic view illustrating the present invention.

Refer to FIG. 4 which illustrates the present invention of an all-in-one SATA interface storage device which is installed on a motherboard 100 and comprises an interface board 30 fixed on the motherboard 100 and prepared for installation of a first memory card slot 40 and a second memory card slot 50: the first memory card slot 40 is a CFAST(CompactFlash)™ slot with which a first plug-in card 45 (FIG. 5), e.g., a CFAST(CompactFlash)™ card, is coupled; the second memory card slot 50 is a slot available to CF-SATA and CFEX cards and prepared for installation of a second plug-in card 55 (FIG. 5), e.g., either a CF-SATA card or a CFEX card.

The first memory card slot 40 (CFAST(CompactFlash)™ slot) internally comprises a plug-in space 400 and a card built-in end 44 in which a plurality of pins (not shown in FIG. 4) are designed. The first memory card slot 40 is externally provided with a circuit connecting end 43 which comprises a plurality of first circuit connecting pins 431 accommodating a plurality of SATA signal pins and power signal pins and electrically connected to pins in the card built-in end 44. The plug-in space 400 is prepared for installation of the first plug-in card 45 which is a CFAST (CompactFlash)™ card used in electrical connection between pins inside the first memory card slot 40 (CFAST (CompactFlash)™ slot) and the first plug-in card 45 in this embodiment. Moreover, the interface board 30 is provided with a first SATA signal port 41 and a first power port 42 at an unspecified side, for example, a first SATA signal port 41 and a first power port 42 at a side edge of the interface board 30 in this embodiment. The first SATA signal port 41 and the first power port 42 are electrically connected to the first circuit connecting pins 431 via circuits on the interface board 30, that is, the SATA signal pins of the first circuit connecting pins 431 on the first memory card slot 40 (CFAST(CompactFlash)™ slot) are electrically connected to the first SATA signal port 41 via circuits on the interface board 30 and the power signal pins of the first circuit connecting pins 431 are also electrically connected to the first power port 42 via circuits on the interface board 30.

Figure 5:
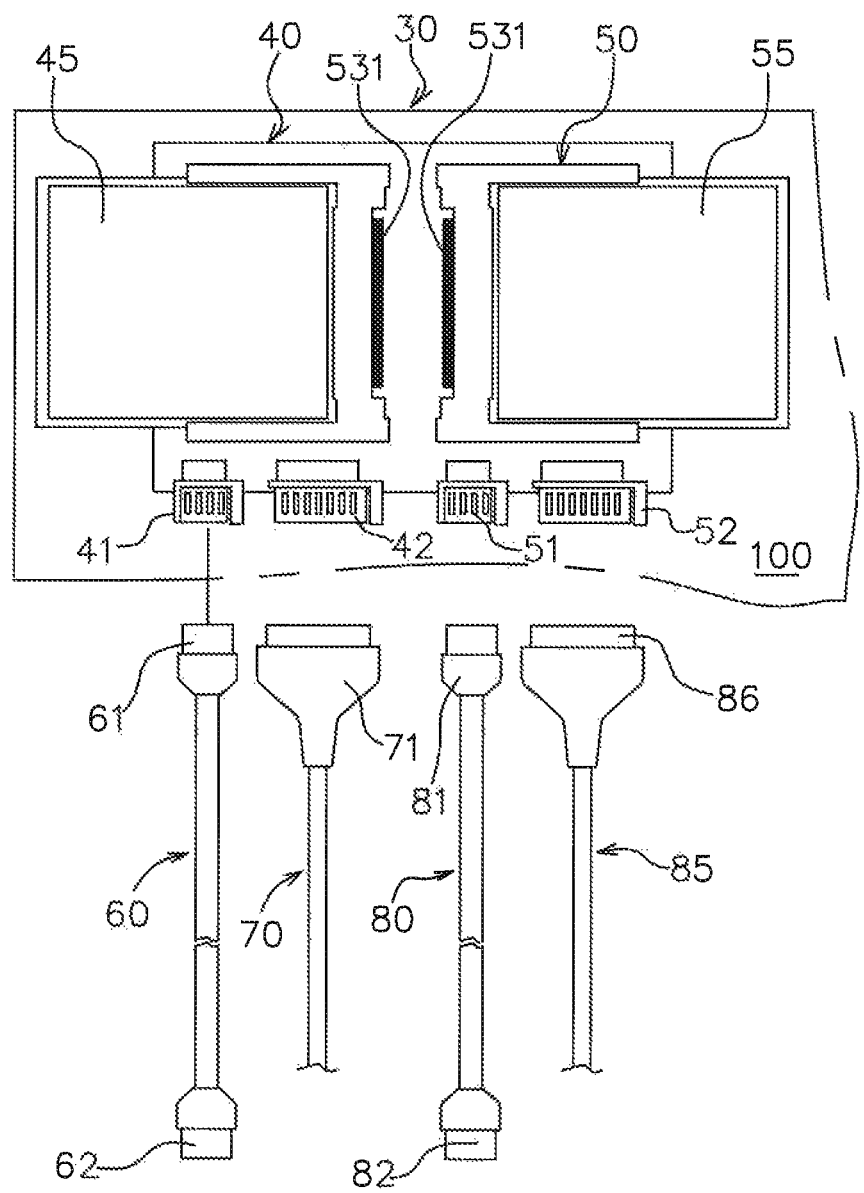
FIG. 5 is a schematic view illustrating signal connection in the present invention.

Refer to FIG. 5 which illustrates the first SATA signal port 41 links a first SATA signal line 60. The first SATA signal line 60 has an interface board connector for SATA signals 61 and a motherboard connector for SATA signals 62 at both ends: the interface board connector for SATA signals 61 is plugged into the first SATA signal port 41; the motherboard connector for SATA signals 62 is plugged into a SATA signal port (not shown in FIG. 5) on the motherboard 100 for internal connection of SATA signals. The first power port 42 is prepared for linking a first power cable 70: the first power cable 70 has an interface board connector for power signals 71 at one end, which is plugged into the first power port 42, and a connector situated at the other end and connected to a power supply (not shown in FIG. 5) which provides electricity for internal connection of power signals via the first power cable 70.

Refer to FIGS. 4 and 5 that illustrate the second memory card slot 50 internally comprising a plug-in space 500 and a card built-in end 54 in which there are a plurality of pins (not shown in FIGS. 4 and 5). The second memory card slot 50 is externally provided with a circuit connecting end 53 which comprises a plurality of second circuit connecting pins 531 accommodating a plurality of SATA signal pins and power signal pins and electrically connected to pins on the second memory card slot 50. Meanwhile, the plug-in space 500 is prepared for installation of the second plug-in card 55 which is a CF-SATA card or a CFEX card electrically connected to pins inside the second memory card slot 50 in this embodiment. Moreover, the interface board 30 is provided with a second SATA signal port 51 and a second power port 52 at an unspecified side, for example, a second SATA signal port 51 and a second power port 52 at a side edge of the interface board 30 in this embodiment. The second SATA signal port 51 and the second power port 52 are electrically connected to the second circuit connecting pins 531 via circuits on the interface board 30, that is, the SATA signal pins of the second circuit connecting pins 531 on the second memory card slot 50 are electrically connected to the second SATA signal port 51 via circuits on the interface board 30 and the power signal pins of the second circuit connecting pins 531 are also electrically connected to the second power port 52 via circuits on the interface board 30.

The second SATA signal port 51 is used to link a second SATA signal line 80. The second SATA signal line 80 has an interface board connector for SATA signal 81 and a motherboard connector for SATA signals 82 at both ends: the interface board connector for SATA signal 81 is plugged into the second SATA signal port 51; the motherboard connector for SATA signal 82 is plugged into another SATA signal port (not shown in FIGS. 4 and 5) on the motherboard 100 for internal connection of SATA signal. The second power port 52 is prepared for linking a second power cable 85: the second power cable 85 has an interface board connector for power signals 86 at one end, which is plugged into the second power port 52, and a connector situated at the other end and connected to a power supply (not shown in FIGS. 4 and 5) which provides electricity for internal connection of power signals via the second power cable 85.

The second slot card 55 shares the same slot (connector) with CF-SATA card and CFEX card. The interface board 30 is provided with a Jumper (not shown in figures) manually switched to the available second plug-in card 55, that is, either a CF-SATA card or a CFEX card, which is able to match the second memory card slot 50; the interface board 30 is provided with a Switch chip by which an available card, i.e., a CF-SATA card and a CFEX card, can be switched automatically. The steps to switch between a CF-SATA card and a CFEX card are shown as follows:

1. The Switch chip mounted on the interface board 30 is used to detect a signal of one card inserted through a specific pin, for example, an identification signal created by a specific pin (e.g., Pin No. 27) of a CFEX card plugged into a corresponding slot is detected by the Switch chip when a specific resistor (or an alternative component) is designed in the specific pin.
2. The Switch chip which refers to the identification signal created by a specific pin of the card inserted is able to automatically execute a switch to (1) a CFEX card with the identification signal created by its specific pin and recognized by the Switch chip or (2) a CF-SATA card otherwise.

Alternatively, the mechanism of switching to a CF-SATA card or a CFEX card which is plugged into the second memory card slot 50 is based on signal switch, for example, preinstalled software for control switch. In this way, the present invention is able to integrate multiple storage interfaces in a SATA device with the all-in-one SATA interface storage device installed on the motherboard 100 for one user who can complete data transmission (e.g., reproduction) in a triple-interface SATA device without extra storage media.

Moreover, the transmission of SATA signal between the all-in-one SATA interface storage devices and peripheral I/O devices can be realized because of the motherboard 100 with circuits and peripheral I/O devices (e.g., connectors) for transmission of SATA signal prepared.

As described hereinbefore, the present invention of an all-in-one SATA interface storage device facilitates applications of multiple storage devices by means of its SATA interface linking a host system, providing a user more convenient new storage devices, and creating higher value-added services by lowering costs.

Accordingly, the present invention significantly meets patentability and is applied for the patent. However, the above descriptions are preferred embodiments which do not limit the scope of the present invention; any equivalent change or improvement in shapes, structure or features without departing from spirit of the present invention should be incorporated in claims herein.

What is claimed is:

1. An all-in-one SATA interface storage device, comprising:
    an interface board installed on a motherboard;
    a first memory card slot which is a CFast slot fixed on said interface board for installation of a CFast card; and
    a second memory card slot fixed on said interface board and available to CF-SATA and CFEX cards for installation of either a CF-SATA card or a CFEX card,
    wherein said interface board is provided with a jumper which is manually switched to said second plug-in card, that is, either a CF-SATA card or a CFEX card; or said interface board is provided with a switch chip used in automatic switch between a CF-SATA card and a CFEX card, each of which can be plugged into said second memory card slot.

2. The all-in-one SATA interface storage device according to claim 1 wherein said first memory card slot is externally provided with a plurality of first circuit connecting pins and said interface board is provided with a first SATA signal port and a first power port at a side, both of which are electrically connected to said first circuit connecting pins via circuits on said interface board.

3. The all-in-one SATA interface storage device according to claim 2 wherein said first circuit connecting pins in said first memory card slot comprise (a) SATA signal pins to be electrically connected to said first SATA signal port via circuits on said interface board and (b) power signal pins to be electrically connected to said first power port via circuits on said interface board.

4. The all-in-one SATA interface storage device according to claim 2 wherein said first SATA signal port is used to link a first SATA signal line which has (a) an interface board connector of SATA signals plugged into said first SATA signal port and (b) a motherboard connector for SATA signals plugged into a SATA signal port on said motherboard.

5. The all-in-one SATA interface storage device according to claim 2 wherein said first power port is used to link a first power cable which has (a) an interface board connector of power signals situated at an end and plugged into said first power port and (b) another connector situated at the other end and connected to a power supply.

6. The all-in-one SATA interface storage device according to claim 1 wherein said second memory card slot is externally provided with a plurality of second circuit connecting pins and said interface board is provided with a second SATA signal port and a second power port at a side, both of which are electrically connected to the circuit connecting pins via circuits of said interface board.

7. The all-in-one SATA interface storage device according to claim 6 wherein said second circuit connecting pins of said second memory card slot comprise (a) SATA signal pins to be electrically connected to said second SATA signal port via circuits on said interface board and (b) power signal pins to be electrically connected to said second power port via circuits on said interface board.

8. The all-in-one SATA interface storage device according to claim 6 wherein said second SATA signal port is used to link a second SATA signal line which has (a) an interface board connector of SATA signals plugged into said second SATA signal port and (b) a motherboard connector for SATA signals plugged into a SATA signal port on said motherboard.

9. The all-in-one SATA interface storage device according to claim 6 wherein said second power port is used to link a second power cable which has (a) an interface board connector of power signals situated at an end and plugged into said second power port and (b) another connector situated at the other end and connected to a power supply.

10. The all-in-one SATA interface storage device according to claim 1, wherein said interface board is provided with a switch chip used in automatic switch between a CF-SATA card and a CFEX card, each of which can be plugged into said second memory card slot, and wherein steps to switch between a CF-SATA card and a CFEX card are shown as follows:

a. the switch chip mounted on the interface board is used to detect a signal of one card inserted through a specific pin, an identification signal created by a specific pinof a CFEX card plugged into a corresponding slot is detected by the switch chip when a specific resistor is designed in the specific pin; and b. the switch chip which refers to the identification signal created by a specific pin of the card inserted is able to automatically execute a switch to (1) a CFEX card with the identification signal created by its specific pin and recognized by the Switch chip or (2) a CF-SATA card otherwise.

\* \* \* \* \*